TAPE PROGRAMMER FOR CONTROLLING ELECTRICAL CIRCUITS

Filed June 1, 1966 4 Sheets-Sheet 1

INVENTORS
LAWRENCE L. NEIDENBERG
BERNARD J. SOPKO
BY
ATTORNEYS

May 12, 1970 L. L. NEIDENBERG ET AL 3,511,976

TAPE PROGRAMMER FOR CONTROLLING ELECTRICAL CIRCUITS

Filed June 1, 1966 4 Sheets-Sheet 2

INVENTORS
LAWRENCE L. NEIDENBERG
BERNARD J. SOPKO
BY Warren A. Witt
ATTORNEY

May 12, 1970 L. L. NEIDENBERG ET AL 3,511,976

TAPE PROGRAMMER FOR CONTROLLING ELECTRICAL CIRCUITS

Filed June 1, 1966 4 Sheets-Sheet 3

INVENTORS
LAWRENCE L. NEIDENBERG
BERNARD J. SOPKO
BY [signature]
ATTORNEY

TAPE PROGRAMMER FOR CONTROLLING ELECTRICAL CIRCUITS

INVENTORS
LAWRENCE L. NEIDENBERG
BERNARD J. SOPKO
BY [signature]
ATTORNEY

United States Patent Office 3,511,976

Patented May 12, 1970

3,511,976
TAPE PROGRAMMER FOR CONTROLLING ELECTRICAL CIRCUITS

Lawrence L. Neidenberg, Maplewood, and Bernard J. Sopko, Fairfield, N.J., assignors to Industrial Timer Corporation, Parsippany, N.J., a corporation of Delaware Filed June 1, 1966, Ser. No. 554,584
Int. Cl. G06k 7/06; H01h 43/10
U.S. Cl. 235—61.11 9 Claims

ABSTRACT OF THE DISCLOSURE

Tape programmer for reading programmed tape to generate a timed sequence operation of a group of electrical circuits including a rotatably mounted drum having a conductive surface, a punched tape of insulative material arranged over the drum and driven thereby, a plurality of brush contacts engaging the tape and making contact with the drum during the passage of punched holes in the tape, wherein successive line-to-line holes may be spaced to coact with the brush contacts so that a brush contact may make with a successive line hole before breaking with a preceding line hole. A protective device protects the brush contacts when in withdrawn position to change or apply a tape to the drum.

This invention relates in general to a programmer, and more particularly to a tape programmer for reading programmed tape in the operation of a group of electrical circuits employed in a system for carrying out a sequence of events, although other uses and purposes may be apparent to one skilled in the art.

The tape programmer of the present invention is especially useful for line-to-line programming incrementally with a time base or for sequentially programming with a continuous running synchronous program. The programmer may include any number of channels, each one of which may be connected to operate a particular circuit, through a relay or otherwise, although one channel may be held open to control incremental or indexing operations. The programmer may also be employed to provide a timed pulse that may be constant or variable for operation of a particular circuit.

The programmer of the invention includes a rotatably mounted drum having an electrically conductive cylindrical surface or a drum having insulatively separated electrically conductive cylindrical surfaces. Thus the drum may be continuous or split depending upon the desired installation. Means is provided to synchronously drive the drum or to incrementally drive the drum depending upon the needs of the installation. A punched tape of insulative material is arranged over the conductive surface of the drum and driven by the drum at the same rate of speed by a suitable sprocket means. The tape may be endless or one that is wound from one reel to another reel and over the drum. A plurality of brush contacts sense or feel the holes or openings in the tape and make electrical contact with the drum in the location of an opening to complete a circuit that would be connected to a brush contact and the drum. Thus, the tape may be continually driven by the drum to provide a timed sequence for programming a particular operation as programmed by punched holes in the tape or it may be incrementally operated by a certain event.

The holes in the tape are arranged in channels across the tape and programmed by lines whereby holes in adjacent lines are spaced to coact with the brush contacts so that a brush contact makes with successive line holes before breaking with a preceding line hole thereby eliminating the need for expensive and troublesome relay holding circuits, memory circuits, or latching circuits.

The brush contacts are mounted on a swingable frame in order to swing them away from contact with the tape and drum so that the tape may be removed or replaced on the drum. Inasmuch as the brush contacts may be easily damaged by engagement with the tape during lateral movement of the tape, and which damage would disable the reading ability of the brush contacts, a protective device is provided to shield the brush contacts during inserting or withdrawing of tapes. This protective device is in the form of a slotted plate that automatically moves into and out of position relative to the brush contacts during swinging of the brush contact frame away from or toward the drum.

One example for using the tape program of the present invention is where a target range is provided to have randomly arranged targets move into and out of view for a timed period to provide target practice for riflemen. Another example of use is where cake mixes may be batched by mixing of several different ingredients.

It is therefore an object of the present invention to provide a new and improved tape programmer.

Another object of this invention is in the provision of a tape programmer for use in an electrical circuit system that is capable of eliminating the need for expensive and troublesome relay circuits, memory circuits, or latching circuits.

Still another object of this invention resides in the provision of a tape programmer having a "make before break" feature to thereby sustain circuit closure when a channel of the tape is punched with successive line holes.

A further object of this invention is in the provision of a tape programmer including a rotatable drum having an electrically conductive surface coacting with a plurality of brush contacts swingably mounted on a frame to permit insertion and withdrawal of tapes on the drum, wherein a protective device is provided to shield the brush contacts against damage during the insertion and withdrawal of a tape.

Other objects, features and advantages of the invention will be apparent from the following detailed disclosure, taken in conjunction with the accompanying sheets of drawings, wherein like reference numerals refer to like parts, in which.

Figures 1, 2:
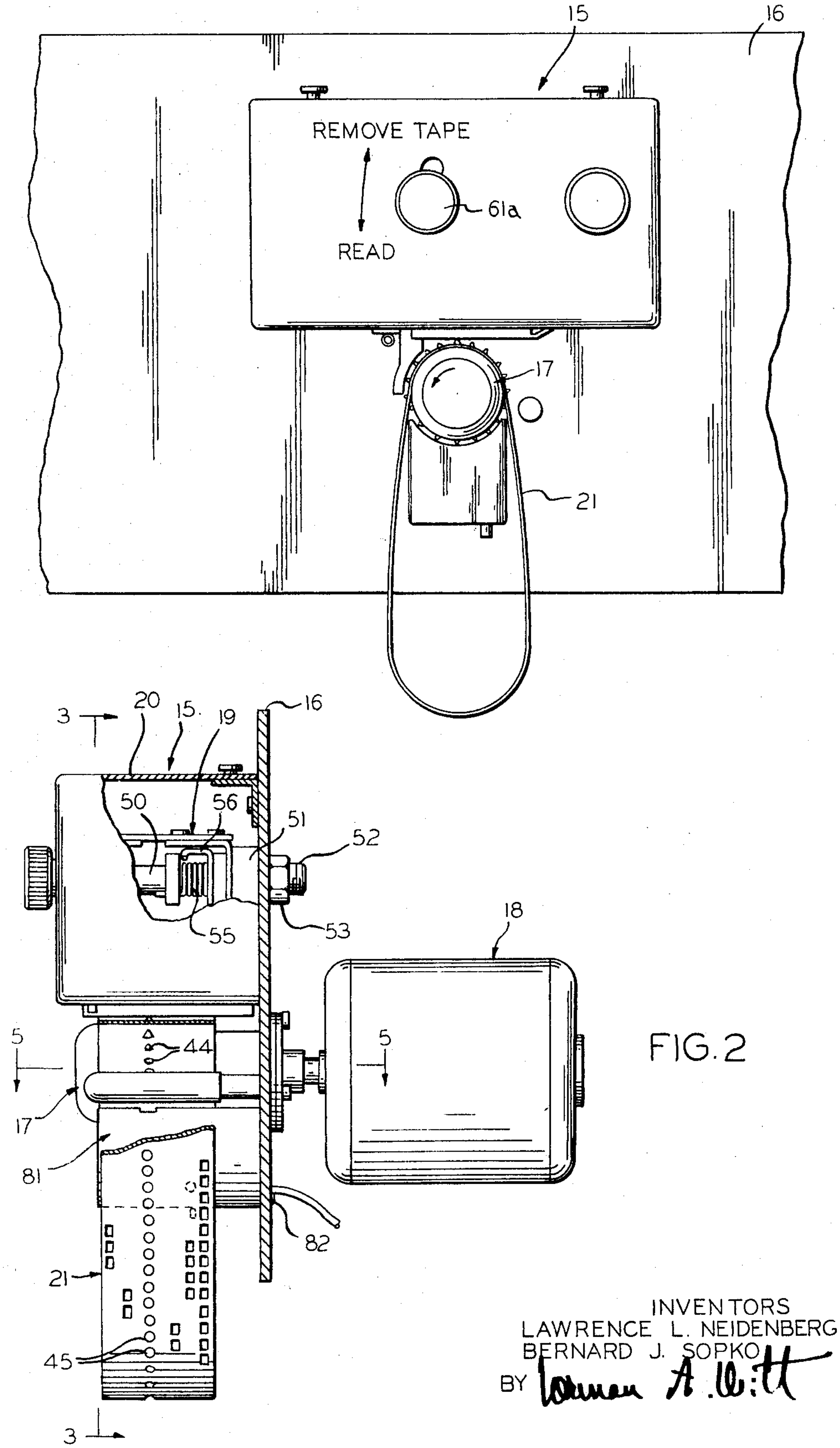
FIG. 1 is a front elevational view of a tape programmer according to the present invention.
FIG. 2 is an end elevational view of the tape programmer of FIG. 1, with some parts broken away for purposes of clarity.

Referring now to the drawings, and particularly to FIGS. 1 and 2, the tape programmer of the present invention is generally indicated by the numeral 15 and is mounted on a panel 16. The tape programmer includes generally a drum 17 rotatably supported by the panel 16 and driven by a motor 18, and a brush contact frame 19 supporting a plurality of brush contacts and being arranged within a housing 20. A continuous or endless tape 21 is shown in FIGS. 1 and 2 in position on the drum 17. However, a tape that is unwound from one reel and wound onto another reel may be fed over the drum 17 for a system. The motor 18 may be of the synchronous type for a timed operation of the drum, or it may be replaced by any other type of drive such as one which would effect step-by-step driving of the drum 17.

Figure 3:
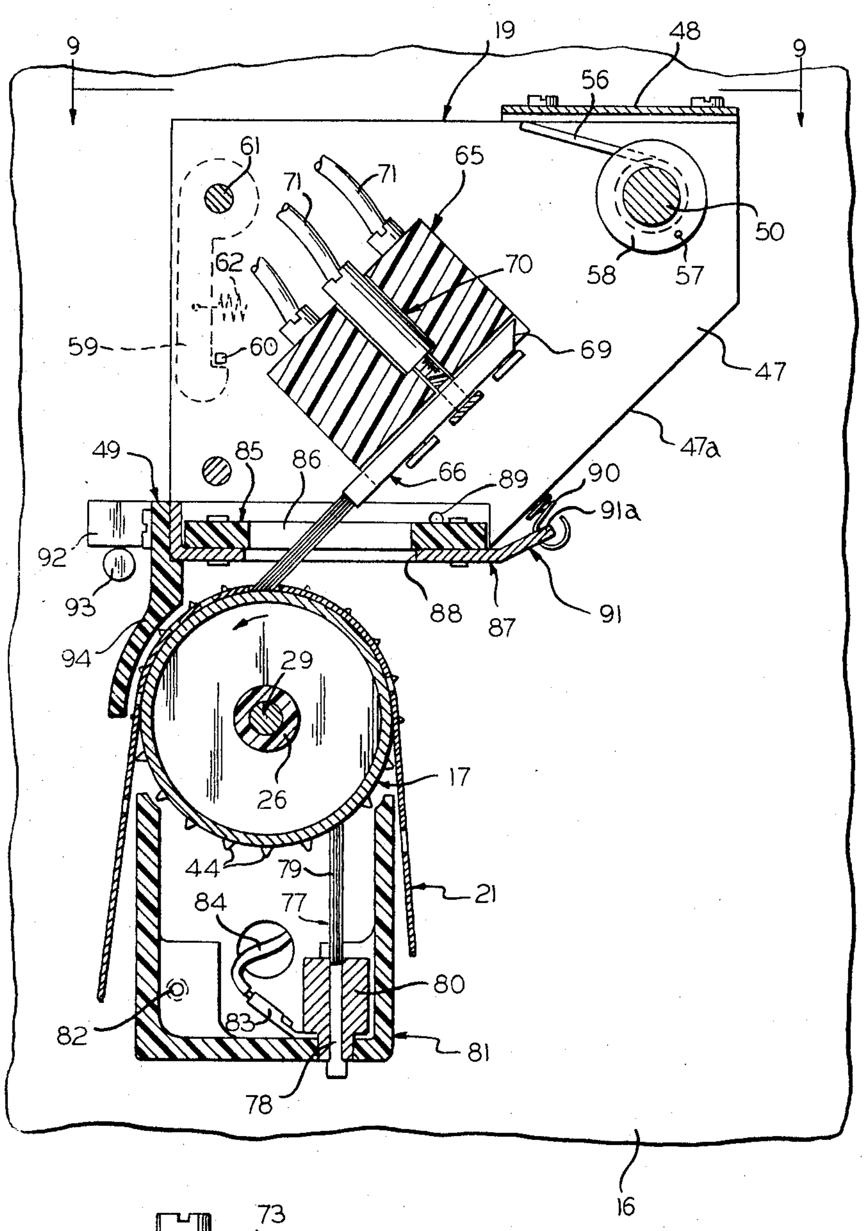
FIG. 3 is an enlarged vertical sectional view taken through the tape programmer of the invention, with some parts removed for purposes of clarity, and taken substantially along line 3—3 of FIG. 2.
Figure 5:
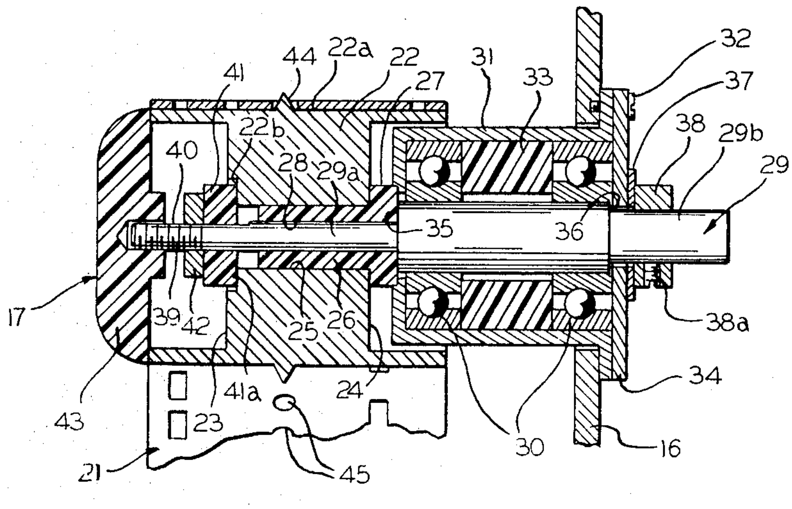
FIG. 5 is an enlarged sectional view of the drum, taken substantially along line 5—5 of FIG. 2.

The drum 17, as seen more particularly in FIGS. 3 and 5, includes a main body 22 of electrically conductive material having a cylindrical electrically conductive surface **22*a* over which the tape 21 is trained. The opposite ends of the body 22 are recessed at 23 and 24, and an axially extending bore 25 is provided in the body which receives a sleeve 26 having a flange 27 on one end thereof abutting against the body in the recess 24. The sleeve 26 is of a suitable insulating material such as nylon or Delrin. The sleeve 26 has an axial bore 28 extending therethrough and receiving a diametrically reduced portion 29*a* of a shaft 29. The shaft 29 is rotatably supported by bearings 30 received in a bearing housing 31 that is secured to the panel 16 by a plurality of fasteners 32. The bearings 30 are held in spaced relation within the bearing housing by means of a spacer 33 and locked in the housing by means of a retaining plate 34. The shaft 29 is shouldered at 35 to prevent movement of the flanged sleeve 26, and at 36 to prevent movement of the shaft toward the right from the bearing housing inasmuch as the shoulder 36 is sized to abut against the retaining flange 34. A washer 37 is received over a diametrically reduced portion 29*b* of the shaft 29 and in abutting relation to the retaining plate 34, and held there in place by a collar 38. The collar 38 is held on the shaft 29 by a setscrew 38*a* and the end of the shaft 29 on the right side of the panel 16** as seen in FIG. 5 would be suitably coupled to a motor or other type of driving device.

The end of the shaft 29 arranged within the drum 17 is threaded at 39 and provided with a flatted portion at 40 to receive a locking collar 41 of insulative material for locking the body 22 of the drum to the shaft portion **29*a* of the shaft 29. The locking collar 41 is provided with a bore that mates with the flatted portion of the shaft so that it will corotate with the shaft, and lugs 41*a* that are received in sockets 22*b* at the recess 23 of the body 22 thereby preventing relative rotation between the collar 41 and the drum body 22. Thus the drum will rotate with the shaft 29, and the drum is insulated from the shaft by the sleeve 26 and the locking collar 41. The locking collar 41 is held in place by a nut 42, and an end cover 43** closes the end of the drum. Further, the end cover has a rounded peripheral edge to help guide the insertion of a tape onto the drum.

In order to drive the tape 21 by the drum, a plurality of sprocket teeth 44 are formed in circumferentially spaced relation along the outer surface of the body 22 to coact with sprocket holes 45 formed or punched in the tape 21. Any other type of means may be provided for driving the tape with the drum, and it should be appreciated that the sprocket teeth may be placed anywhere along the conductive surface of the drum.

Figures 10, 11, 12, 13:
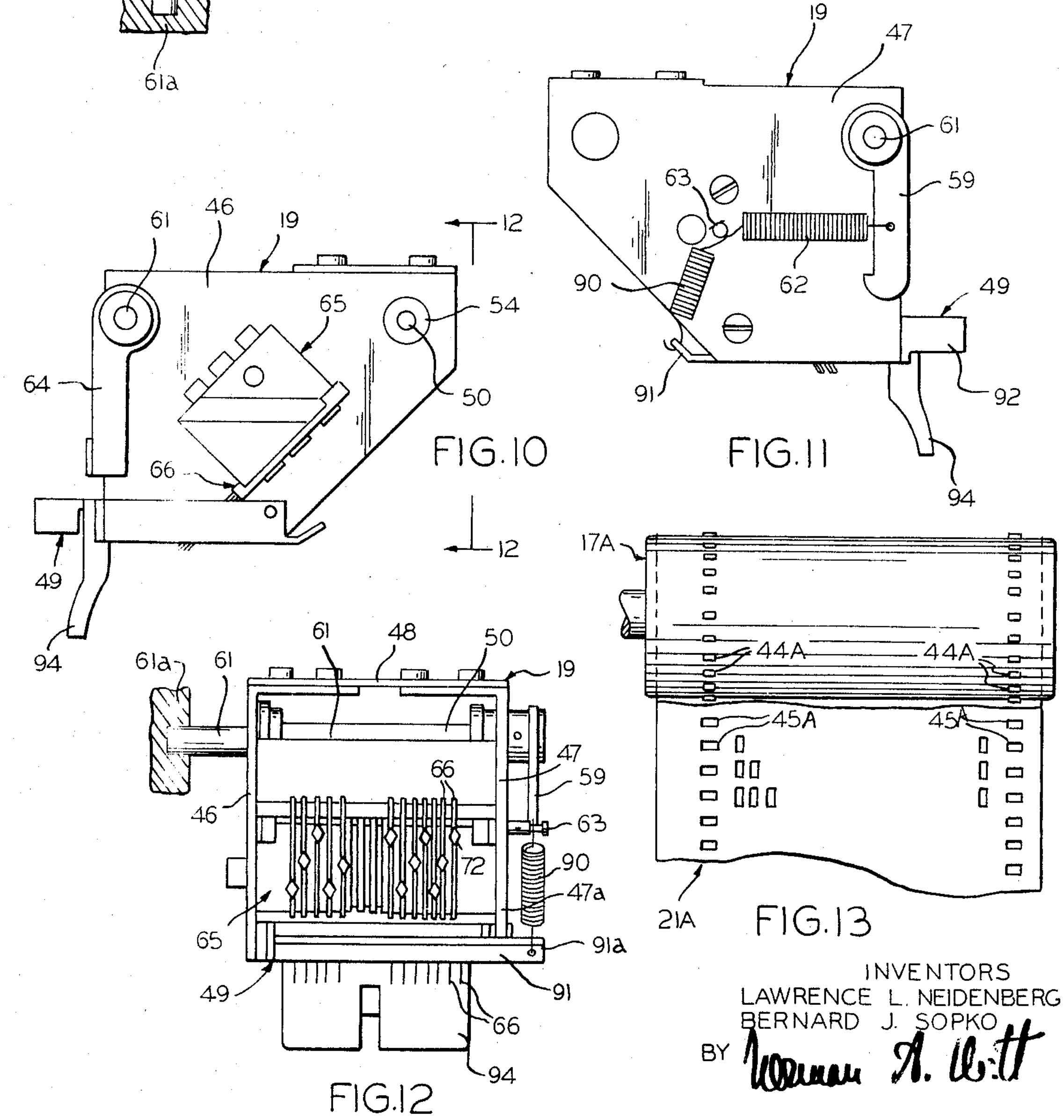
FIG. 10 is a front elevational view of the brush contact frame.
FIG. 11 is a rear elevational view of the brush contact frame.
FIG. 12 is an end elevational view of the brush contact frame, taken substantially along line 12—12 of FIG. 10.
FIG. 13 is an elevational view of a modification of the drum and a tape therefor.

It should further be appreciated that the tape and drum may be of any desired width, and may be wider than the tape 21 and drum 17 to accommodate more channels. For example, the embodiment of FIG. 13 shows a drum 17A and a tape 21A therefor which differs from the embodiment of FIG. 2 in that a double row of sprocket teeth 44A are provided to mate with the sprocket holes 45A on the tape 21A to drive the tape over the drum. Any number of rows of sprocket teeth and holes may be provided.

The brush contact frame 19 includes a pair of spaced, upright side plates 46 and 47 interconnected together at the top by a connecting plate 48, and at the bottom by the protective device 49, the latter of which will be more clearly hereinafter described. The frame is pivotally supported on the panel 16 by a shaft 50 that is flanged at 51, FIG. 2, and provided with a threaded portion 52 extending through a hole in the panel 16 and locked thereto by a nut 53. The shaft 50 is stationary, and the opposite side plates 46 and 47 of the frame 19 are provided with openings received over the shaft and the frame is held in place thereon by means of a collar 54, FIG. 10. A spring 55 is received over the shaft 50. One end 56 of the spring, FIGS. 2 and 3, bears against an inwardly extending flange extending from the side plate 47, and the other end is indicated generally by the numeral 57 and received in a hole formed in a collar 58 that is locked to the shaft 50. Thus, a constant biasing force is applied from the shaft 50 to the frame 19 to force it in an upward position such as shown in dotted lines in FIG. 7.

Figure 7:
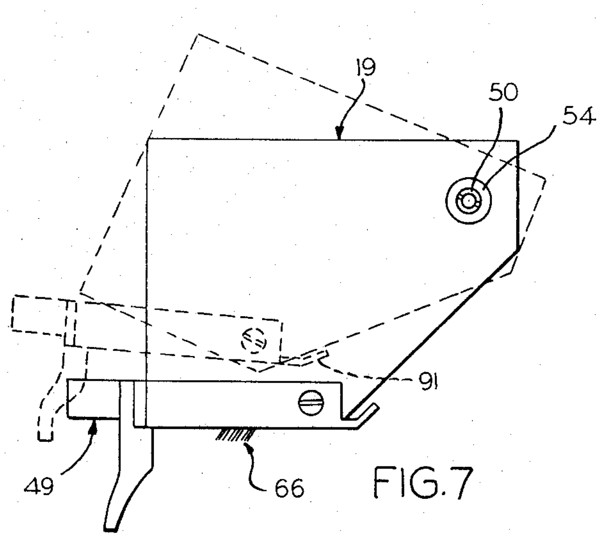
FIG. 7 is a somewhat diagrammatic view showing the operation of the brush contact protective device according to the present invention, illustrating the protective device in covered relation relative to the brush contacts in the dotted line position.
Figure 9:
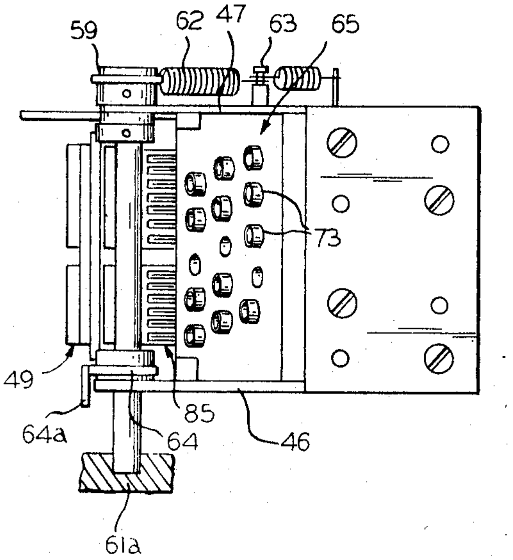
FIG. 9 is a top plan view of the programmer, taken substantially along line 9—9 of FIG. 3.

The frame 19 is held in its lower operative position as shown in solid lines in FIG. 7 by means of a latching member 59 engageable with a lug 60 formed or mounted on the panel 16. The latching member 59, FIGS. 3 and 11, is secured on the end of a pin 61 rotatably supported by both of the side plates 47 and 58. A spring 62 has one end hooked to the latch in member 59 and the other member hooked to a pin 63 fixed to the side plate 47 to continually urge the latching member 59 in a clockwise direction as seen in FIG. 11. In order to facilitate rotation of the pin 61 to force the latching member 59 out of engagement with the lug 60, a knob **61*a* is provided on the outer end of the pin 61 to permit grasping thereof and rotation by an operator. A stop bar 64 is secured to the pin 61 at the inside surface of the side plate 46, and provided with a laterally extending tab 64*a* adapted to engage against an edge of the side plate 46 to limit rotation of the pin 61. Thus, rotation of the pin 61 in a clockwise direction, as seen in FIG. 3, will release the brush contact frame 19** and allow it to swing upwardly to the position shown in dotted lines in FIG. 7.

Figure 4:
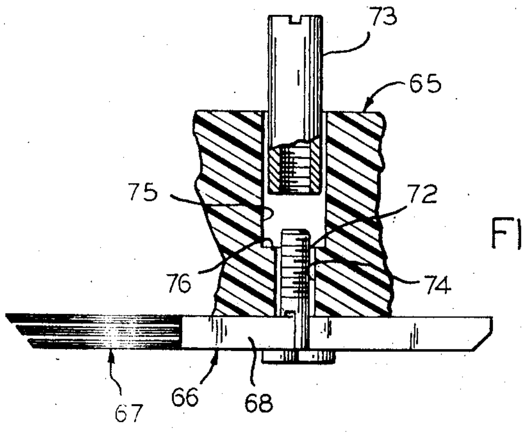
FIG. 4 is an enlarged detail sectional and partly exploded view of the brush contact block, illustrating the manner in which a brush contact is mounted thereon.

A brush contact block 65 is fixed at opposite ends to the opposing side plates 46 and 47 and arranged therebetween to support a plurality of brush contacts 66. The brush contact block 65 is made of suitable insulating material to insulate each brush contact from the side plates 46 of the brush contact frame 19. As seen in FIG. 4, each brush contact 66 includes a plurality of flexible wires 67 that are held in a grouped fashion by a ferrule or wire holder 68. The entire brush contact is constructed of electrically conductive material, and each brush contact is received in a slot 69, FIG. 3, formed in the brush contact block 65. A fastener 70 is provided to secure each brush contact to the brush contact block, and to also connect each brush contact to a suitable conductor 71. The conductor 71 would in turn be connected to a circuit.

Each fastener 70 includes a bolt 72 and a nut 73, the bolt having a slot therein to receive the brush contact, and then extending into a bore 74 formed in the brush contact block 65. The bore 74 is coextensive with a larger bore 75 thereby defining a shoulder 76 therebetween. The nut 73 is drawn onto the bolt 72 until it bears against the shoulder 76, thereby locking the brush contact in place on the brush contact block 65.

The brush contact block 65 is oriented so that the brushes 66 form an angle with the surfaces of the drum 17 and extend in the direction of rotation of the drum as seen particularly in FIG. 3. Further, the brush contact frame 19 coacts with the brush contact block 65 and the brushes 66 so that when it is swung to its downward or operating position and locked in place by the latching member 59, the tip ends of the brush contact wires will engage the surface of the drum 17 when allowed to do so by holes formed in the tape 21.

Each circuit that would be connected to a conductor 71 and a reading brush 66 would also be connected to a common brush contact 77. FIG. 3, arranged below the drum 17 and always in contact with the electrically conductive surface thereof. The common brush contact 77 includes a ferrule 78 supporting a plurality of flexible steel wires 79 which are always in contacting engagement with the drum 17. The common brush contact 77 is supported by an electrically conducting block 80 that is in turn secured to a cover member 81 constructed of non-conducting materials such as nylon or Delrin, and which is secured to the panel 16 by suitable fasteners 82. The cover member 81 thereby encloses the common brush contact 77 and also insulates same against the panel 16. A suitable wire connecting lug or terminal 83 is secured to the block 81 and for the purpose of having a conductor 84 secured thereto which leads to the circuits of the brush contact 66. While the drum 17 illustrated in the drawings is one having a continuous electrically conducting surface, it may be one having a plurality of conducting surfaces axially separated by insulated means, and in that case it would be necessary to provide a similar number of common brush contacts in place of the single brush contact 77.

Inasmuch as the flexble steel wires 67 on the brush contact 66 may be easily bent and damaged by engagement of a tape during insertion or removal of a tape from the drum 17, the protective device 49 serves to shield the wires 67 when the brush contact frame 19 is in the position to permit removal or insertion of a tape on the drum. This protective device 49 includes a non-conducting plate 85, of nylon, Delrin or the like, that is provided with a plurality of brush receiving slots 86 for permitting the wire end of a brush contact to extend therethrough for engagement with the tape and drum, as seen in FIG. 3, or be shielded when the contact frame 19 is in the upper swung position as seen in dotted lines in FIG. 7. The slotted plate 85 is shown in the drawings as being comprised of a pair of plates or in section, but it may be a single plate, but in any event the plate is mounted on a metal frame 87 having a rectangular opening 88 in registry with the slots 86. The frame 87 is pivotally mounted on pins 89 fixed to the opposed side plates 46 and 47, and continually biased to move counterclockwise as seen in FIG. 3 by a spring 90 that is connected at one end to the pin 63 and at the other end to a tab portion 91*a* extending laterally from an upwardly bent stop portion 91 at the rear of the frame 87. The stop portion 91 limits the counterclockwise rotation of the frame 87 when it engages against the side plate 47 at the edge 47*a*. The frame 87 is swung to a position so that the brush contacts extend through the slotted plate 85 as seen in FIG. 3, when the brush contact frame 19 is moved to its down and locked position by a lug 92 extending from the frame 87 and engaging a stationary pin 93 extending outwardly from the panel 16. A non-conducting comb 94 is mounted on the frame 87 and extends downwardly therefrom and in overlying relation with the surface of the drum 17 to aid in maintaining the tape 21 on the drum 17. Thus, release of the latching member 59 and the raising of the brush contact frame 19 automatically permits the protective device 49 to swing into shielding relation with respect to the brush contact 66 by action of the spring 90, while swinging of the brush contact frame 19 into its down and locked position automatically causes the protective device 49 to expose the ends of the brush contact 66 and allow them to contact the tape and drum. Therefore, the wire ends of the brush contacts are protected against damage during insertion or withdrawal of a tape from the drum 17.

The tape 21 is of an insulative material, such as a rope-paper, mylar laminate which has a high insulation capacity and is not subject to static electricity. Further, the rope-paper provides continuous brush cleaning.

Figure 8:
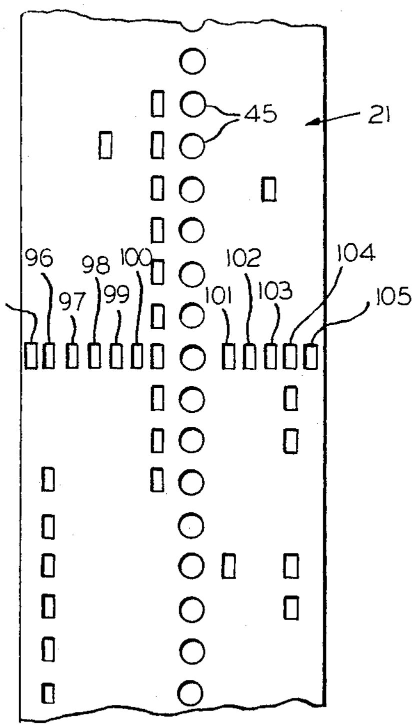
FIG. 8 is a plan view of a section of a punched tape employed with the embodiment of the invention shown in FIG. 5.

The embodiment illustrated in the drawing handles a tape having twelve channels, as seen in FIG. 8 and identified by the numerals 95, 96, 97, 98, 99, 100, 101, 102, 103, 104 and 105, all of which are arranged across the width of the tape. It should be appreciated that any number of channels may be provided so long as there are also an equal number of reading brushes 66. In this embodiment there are twelve reading brushes provided, one for each of the channels.

Figure 6:
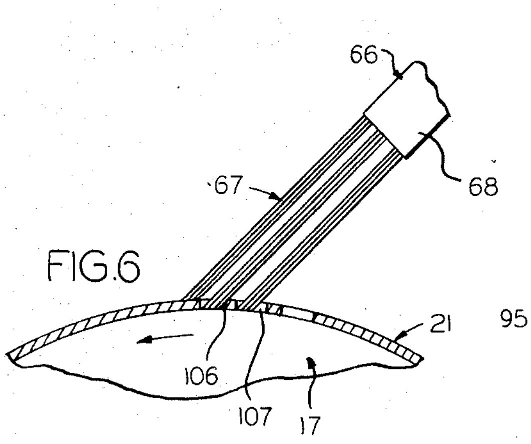
FIG. 6 is an enlarged fragmentary view illustrating the manner in which a brush contact makes before breaking by overlapping successive line holes in a tape.

Circuit closure is programmed on a line basis along the longitudinal axis of the tape, wherein a hole in the tape permits the wires 67 of a brush contact to engage and make contact with the electrically conductive surface of the drum 17. The tape reader of the present invention eliminates the requirement of memory circuits or locking relays because of the coaction between the reading brushes and the holes in the tape. The coaction provides a "make before break," wherein contact is made in a newly punched hole before it is broken in a preceding hole as seen particularly in FIG. 6, wherein the drum and tape move in a counterclockwise direction past the wires 67 of the brush so that the wires first make contact with the drum through the first punched hole 106, and thereafter make contact with the punched hole 107 before breaking contact with the punched hole 106. Thus, sustained switch closure occurs as long as subsequent holes are punched line-by-line in the tape. The number of lines on a tape depends upon the length thereof which can vary. As already mentioned, the tape is preferably endless, but in some instances it may be desirable to program on a tape that is unwound from one reel and wound up on another reel. The tape may be driven continually by a synchronous motor to provide a timed sequence for programming a particular operation or it may be incrementally advanced by the happening of a certain event. In the latter instance, one of the channels on a tape may be employed to control the drive for indexing or incremental advancing in response to a particular signal.

It will be understood that modifications and variations may be effected without departing from the scope of the novel concepts of the present invention.

The invention is hereby claimed as follows:

1. A tape programmer for reading a punched tape of insulative material wherein the tape is provided with a programmed line-to-line series of holes arranged in channels, said programmer comprising a rotatably mounted drum adapted to have a tape trained thereover and having a cylindrical electrically conductive contractor surface, means for driving said drum, means on said drum for driving said tape, and a plurality of brush contacts one for each channel arranged adjacent said drum and in engagement with said tape to contact said drum through the holes in the tape, each brush contact adapted to be connected in a circuit, each circuit being also connected to said drum whereby the circuit of a brush contact is closed upon engagement between that brush contact and said drum as allowed by holes in the punched tape, a brush contact frame for supporting said brush contacts, means for swingably mounting said frame to swing the frame and brush contacts out of and into engagement with said tape and drum contactor surface to permit withdrawal or insertion of a tape on the drum, means for locking the frame in a position where the brush contacts engage the tape and drum, and a protective device on said frame for shielding the brush contacts when the frame is in position away from the drum, the spacing between successive line holes in any channel and the engagement between the brush contacts and the drum being such that contact between a brush contact and the drum will be made in a successive line hole before breaking from the preceding line hole.

2. A tape programmer as defined in claim 1, and a protective device on said frame for shielding the brush contacts when the frame is in position away from the drum, wherein said device includes a slotted plate through which the brush contacts extend when the frame is in locked position.

3. A tape programmer as defined in claim 2, wherein said tape driving means on said drum includes sprocket teeth meshing in sprocket holes formed in the tape.

4. A tape programmer for reading a punched tape of insulative material wherein the tape is provided with a programmed line-to-line series of holes arranged in channels, said programmer comprising a rotatably mounted drum adapted to have a tape trained thereover and having a cylindrical electrically conductive contactors surface, means for driving said drum, means on said drum for driving said tape, a brush contact frame, a plurality of brush contacts supported on said frame, one for each channel, each brush contact adapted to be connected in a circuit, each circuit being also connected to said drum whereby the circuit of a brush contact is closed upon engagement between that brush contact and said drum as allowed by holes in the punched tape, means for swingably mounting said frame to swing the frame and brush contact mounted thereon so that the brush contact are out of or into engagement with said tape and drum to permit withdrawal or insertion of a tape on the drum, and a protective device mounted on said frame for shielding said brush contacts when the frame is in position away from the drum.

5. A tape programmer as defined in claim 4, wherein said device includes a slotted plate through which the brush contacts extend when the frame is in locked position and the brush contacts engage the tape and drum.

6. A tape programmer as defined in claim 5, wherein said slotted plate is of an insulative material.

7. A tape programmer as defined in claim 5, and means for automatically moving said slotted plate between shielding and non-shielding positions as the frame is swung toward and away from the drum.

8. A tape programmer for use as a timer to control sequential operation of a plurality of electrical circuits, said programmer comprising a punched tape of insulative material, said tape having programmed line-to-line series of holes arranged in juxtaposed channels extending across the tape, a rotatably mounted drum having a cylindrically electrically conductive contactor surface connected to each of said electrical circuits and over which is received said tape, means for driving said drum, means on the drum for positively engaging said tape to drive same during rotation of said drum, a brush contact frame, a plurality of brush contacts supported on said frame one for each channel and adapted to be connected into one of said electrical circuits whereby each brush contact coacts with said drum contactor surface and tape to function as a switch for the electrical circuit connected to the brush contact, the spacing between successive line holes in any channel of the tape wherein the engagement of the brush contacts on the tape and the drum contactor surface as allowed by holes in the tape in such that contact between a brush contact and the drum contactor surface will be made in a successive line hole before breaking from the preceding line hole thereby establishing sustained switch closure, and means for swingably mounting said frame to swing the frame and brush contacts away from or into engagement with said tape and drum contactor surface to permit removal or the placement of a tape on the drum.

9. A tape programmer as defined in claim 8, and a brush contact protective device on said brush contact frame automatically movable between brush contact shielding and non-shielding positions as the brush contact frame is swung away from and toward said drum.

References Cited

UNITED STATES PATENTS

| | | | |
|---|---|---|---|
| 1,791,762 | 2/1931 | Peirce | 235—61.111 XR |
| 2,129,764 | 9/1938 | Hayes | 235—61.111 XR |
| 2,441,145 | 5/1948 | Hansen | 340—173 XR |
| 2,562,251 | 7/1951 | Wockenfuss | 235—61.112 |
| 2,741,530 | 4/1956 | Hill. | |
| 2,852,538 | 4/1958 | Howe et al. | 235—61.111 |
| 3,005,056 | 10/1961 | Goldmark et al. | |
| 3,150,810 | 9/1964 | Heaton | 226—90 XR |
| 3,143,730 | 8/1964 | McIntyre | 340—347 |
| 3,386,654 | 6/1968 | Wallace | 235—61.1 |
| 3,392,381 | 7/1968 | Hargens | 340—347 |
| 3,345,500 | 10/1967 | Russell | 235—61.11 |
| 2,016,681 | 10/1935 | Mills | 235—61.12 |
| 1,444,503 | 2/1923 | Hathaway | 235—61.6 |
| 3,195,257 | 7/1965 | Weihe | 235—61.12 |

MAYNARD R. WILBUR, Primary Examiner

T. J. SLOYAN, Assistant Examiner

U.S. Cl. X.R.

200—46